US007890463B2

(12) United States Patent
Romem et al.

(10) Patent No.: US 7,890,463 B2
(45) Date of Patent: Feb. 15, 2011

(54) APPARATUS AND METHOD FOR A DISTRIBUTED STORAGE GLOBAL DATABASE

(75) Inventors: Yaniv Romem, Jerusalem (IL); Gilad Zlotkin, Mevasseret Zion (IL); Ilia Gilderman, Jerusalem (IL); Avi Vigder, Petach-Tikva (IL)

(73) Assignees: Xeround Systems Ltd., Yahud (IL); Xeround Inc., Bellevue, WA (US)

( * ) Notice: Subject to any disclaimer, the term of this patent is extended or adjusted under 35 U.S.C. 154(b) by 345 days.

(21) Appl. No.: 11/902,629

(22) Filed: Sep. 24, 2007

(65) Prior Publication Data

US 2009/0070337 A1 Mar. 12, 2009

Related U.S. Application Data

(60) Provisional application No. 60/847,613, filed on Sep. 28, 2006.

(51) Int. Cl.
*G06F 7/00* (2006.01)
*G06F 17/00* (2006.01)

(52) U.S. Cl. ............... 707/636; 707/652; 707/770; 707/781; 707/783; 709/225

(58) Field of Classification Search ............... 707/1–10, 707/100–104.1, 200–206; 711/1, 100, 111, 711/150–152, 169; 709/203, 217, 219, 225
See application file for complete search history.

(56) References Cited

U.S. PATENT DOCUMENTS

| | | | |
|---|---|---|---|
| 5,252,294 A | 10/1993 | Kroy et al. | |
| 5,580,523 A | 12/1996 | Bard | |
| 5,777,888 A | 7/1998 | Rine et al. | |
| 5,858,804 A | 1/1999 | Zanzucchi et al. | |
| 6,331,274 B1 | 12/2001 | Ackley et al. | |
| 6,565,815 B1 | 5/2003 | Chang et al. | |

(Continued)

FOREIGN PATENT DOCUMENTS

DE 10061872 6/2002

(Continued)

OTHER PUBLICATIONS

Cannataro et al., Distributed data mining on grids: services, tools, and applications, Dec. 2004, IEEE, vol. 34, 2451-2465.*

(Continued)

*Primary Examiner*—Jean B Fleurantin (57) ABSTRACT

A geographically distributed storage system for managing the distribution of data elements wherein requests for given data elements incur a geographic inertia. The geographically distributed storage system comprises geographically distributed sites, each comprises a site storage unit for locally storing a portion of a globally coherent distributed database that includes the data elements and a local access point for receiving requests relating to ones of the data elements. The and geographically distributed storage system comprises a data management module for forwarding at least one requested data element to the local access point at a first of the geographically distributed sites from which the request is received and storing the at least one requested data element at the first site, thereby to provide local accessibility to the data element for future requests from the first site while maintaining the globally coherency of the distributed database.

19 Claims, 6 Drawing Sheets

U.S. PATENT DOCUMENTS

| | | |
|---|---|---|
| 6,664,104 B2 | 12/2003 | Pourahmadi et al. |
| 6,985,901 B1 | 1/2006 | Sachse et al. |
| 7,376,805 B2 | 5/2008 | Stroberger et al. |
| 2002/0006605 A1 | 1/2002 | Gu |
| 2002/0015940 A1 | 2/2002 | Rao et al. |
| 2002/0045272 A1 | 4/2002 | McDevitt et al. |
| 2002/0133491 A1* | 9/2002 | Sim et al. ............ 707/10 |
| 2004/0009485 A1 | 1/2004 | Gonye et al. |
| 2004/0018485 A1 | 1/2004 | Ravkin et al. |
| 2004/0063162 A1 | 4/2004 | Dunlay et al. |
| 2004/0210577 A1 | 10/2004 | Kundu et al. |
| 2006/0041580 A1* | 2/2006 | Ozdemir et al. ............ 707/102 |
| 2007/0288530 A1 | 12/2007 | Romem et al. |
| 2008/0126357 A1* | 5/2008 | Casanova et al. ............ 707/10 |

FOREIGN PATENT DOCUMENTS

| | | |
|---|---|---|
| EP | 1209569 | 5/2002 |
| EP | 1387269 | 2/2004 |
| WO | WO 94/01584 | 1/1994 |
| WO | WO 00/17624 | 3/2000 |
| WO | WO 00/39346 | 7/2000 |
| WO | WO 02/44427 | 6/2002 |
| WO | WO 02/048338 | 6/2002 |
| WO | WO 03/081464 | 1/2003 |
| WO | WO 2005/069737 | 8/2005 |
| WO | WO 2005/069738 | 8/2005 |
| WO | WO 2006/090367 | 8/2006 |
| WO | WO 2007/141791 | 12/2007 |
| WO | WO 2008/038271 | 4/2008 |

OTHER PUBLICATIONS

Lopriore et al., Access control mechanisms in a distributed, persistent memory system, Oct. 2002, IEEE, 1066-1083.*

Tam et al., Fast recovery in distributed shared virtual memory systems, May 28-Jun. 1, 1990, IEEE, 38-45.*

Communication Relating to the Results of the Partial International Search Dated Dec. 20, 2007 From the International Searching Authority Re.: Application No. PCT/IL2007/000689, All Pages.

International Preliminary Report on Patentability Dated Apr. 9, 2009 From the International Bureau of WIPO Re.: Application No. PCT/IL2007/001173, All Pages.

International Preliminary Report on Patentability Dated Dec. 10, 2008 From the International Bureau of WIPO Re.: Application No. PCT/IL2007/000689, All Pages.

International Search Report Dated Feb. 18, 2008 From the International Searching Authority Re.: Application No. PCT/IL2007/001173, All Pages.

Written Opinion Dated Feb. 18, 2008 From the International Searching Authority Re.: Application No. PCT/IL2007/001173, All Pages.

Franklin et al. "Transactional Client-Server Cache Consistency: Alternatives and Performance", ACM Transactions on Database Systems, 22(3): 315-363, 1997. p. 315, § 1, p. 317, § 2—p. 318, § 1, p. 319, Last § —p. 321, § 1, Fig.1, p. 325, Last § —p. 335, § 1, p. 356, § 3—p. 359, § 1.

Keller et al. "A Predictive-Based Caching Scheme for Client-Server Database Architectures", Proceedings of the 3rd International Conference on Parallel and Distributed Information Systems, Austin, TX, USA, IEEE Computer Society, p. 229-238, 1994.

Salem et al. "Checkpointing Memory-Resident Databases", Proceedings of the 5th International Conference on Data Engineering, Los Angeles, CA, USA, p. 452-462, 1989. p. 456, 1-h col. § 1—p. 456, r-h col. Last §.

International Search Report and the Written Opinion Dated Sep. 23, 2005 From the International Searching Authority Re.: Application No. PCT/IL05/00090, All Pages.

International Search Report and the Written Opinion Dated Sep. 26, 2006 From the International Searching Authority Re.: Application No. PCT/IL05/00091, All Pages.

International Search Report and the Written Opinion Dated Feb. 28, 2008 From the International Searching Authority Re.: Application No. PCT/IL2007/000689, All Pages.

Offical Action Dated Oct. 27, 2009 From the US Patent and Trademark Office Re.: U.S. Appl. No. 11/808,211, All Pages.

Response Dated Nov. 23, 2009 to Official Action of Oct. 27, 2009 From the US Patent and Trademark Office Re.: U.S. Appl. No. 11/808,211, All Pages.

Official Action Dated Mar. 4, 2010 From the US Patent and Trademark Office Re.: U.S. Appl. No. 11/808,211.

Official Action Dated Aug. 18, 2010 From the US Patent and Trademark Office Re.: U.S. Appl. No. 11/808,211.

Arikawa et al. "Microbial Biosensors Based on Respiratory Inhibition", Methos in Biotechnology, 6(Chap.16): 225-235, 1998.

Bartolome et al. "Genotoxicity Monitoring Using A 2D-Spectroscopic GFP Whole Cell Biosensing System", Sensor and Actuators B, 89: 27-32, 2003.

Belkin "A Panel of Stress-Responsive Luminous Bacteria for Monitoring Wastwater Toxicity", Methods in Molecular Biology, 102(Chap.21): 247-258, Sep. 24, 2007.

Belkin "Microbial Whole-Cell Sensing Systems of Environmental Pollutants", Current Opinion in Microbiology, 6: 206-212, 2003.

Ben-Israel et al. "Identification and Quantification of Toxic Chemicals By Use of *Escherichia coli* Carrying Lux Genes Fused to Stress Promoters" Applied And Environmental Microbiology,64(11):4346-4352, 1998.

Biran et al. "Optical Imaging Fiber-Based Live Bacterial Cell Array Biosensor", Analytical Biochemistry, 315: 106-113, 2003.

Biran et al. "Optical Imaging Fiber-Based Single Live Cell Array: A High-Density Cell Assay Platform", Analytical Chemistry, 74(13): 3046-3054, 2002.

Burlage et al. "Living Biosensors for the Management and Manipulation of Microbial Consortia", Annual Reviews in Microbiology, 48: 291-309, 1994.

Di Paolantonio "Induced Bacterial Electrode for the Potentiometric Measurment of Tyrosine", Analytica Chimica Acta, vol. 141: p. 1-13, 1982.

Felscin et al. "Enalapril Microbisl Biosensor", Preparative Biochemistry and Biotechnology, 28(3): p. 261-269, 1998.

Harkins et al. "The Role of Host Organism, Transcriptional Switches and Reporter Mechanisms in the Performance of Hg-Induced Biosensors", Journal of Applied Microbiology, 97: 1192-1200, 2004.

Joshi et al. "Immobilization of Activated Sludge For The Degradation of Phenol", J. Environ. Sci. Health, A34 (8), p. 1689-1700, 1999.

Knight et al. "Fluorescence Polarization Discriminates Green Fluorescent Protein From Interfering Autofluorescence in A Microplate Assay for Genotoxicity", Journal of Biochemical and Biophysical Methods, 51: 165-177, 2002.

Köhler et al. "Reporter Gene Bioassays in Environmental Analysis", Fresenius Journal of Analytical Chemistry, 366: 769-779, 2000.

Lemarchand et al. "Molecular Biology and DNA Microarray Technology for Microbial Quality Monitoring of Water", Critical Reviews in Microbiology, 30: 145-172, 2004.

Min et al. "Specific Responses of Bacterial Cells to Dioxins", Environmental Toxicology and Chemistry, 22(2): 233-238, 2003.

Misawa et al. "A Method to identify cDNAs Based on Localization of Green Fluorescent Protein Fusion Products" PNAS,97(7):3062-3066, 2000.

Mitchell et al. "An *Escherichia coli* Biosensor Capable of Detecting Both Genotoxic and Oxidative Damage", Applied Microbiology and Biotechnology, 64(1): 46-52, 2004.

Regenfelder et al. "G Proteins in Ustilago Maydis: transmission of Multiple Signals?", The EMBO Journal vol. 16 No. 8, p. 1934-1942, 1997.

Riedel et al. "Adaptable Microbial Sensors",Analytical Letters, 23:5, p. 757-770, 1990.

Riedel et al. "Arxula Adeninivorans Based Sensor for the Estimation of Bod", Analytical Letters, 31(1): 1-12, 1998.

Riether et al. "Assessment of Heavy Metal Bioavailability Using *Escherichia Coli* ZntAp::Lux and CopAp::Lux-Based Biosensors", Applied Microbiology and Biotechnology, 57(5-6): 712-716, 2001.

Sagi et al. "Fluorescence and Bioluminescence Reporter Functions in Genetically Modified Bacterial Sensor Strains", Sensor and Actuators B, 90: 2-8, 2003.

Simonian et al. "Microbial Biosensors Based on Potentiometric Detection", Methods in Biotechnology, 6(Chap.17): 237-248, 1998.

Švitel et al. "Microbial Cell-Based Biosensor for Sensing Glucos, Sucrose or Lactose", Biotechnol. Appl. Biochemistry, vol. 27: p. 153-158, 1998.

Van Dyk et al. "LuxArray, A High-Density, Genomewide Transcription Analysis of *Escherichia coli* Using Bioluminescent Reporter Strains", Journal of Bacteriology, 183(19): 5496-5505, 2001.

Van Dyk et al. "Rapid and Sensitive Pollutant Detection by Induction of Heat Shock Gene-Bioluminescence Gene Fusions", Applied and Environmental Microbiology,60(5):1414-1420, 1994.

* cited by examiner

APPARATUS AND METHOD FOR A DISTRIBUTED STORAGE GLOBAL DATABASE

RELATIONSHIP TO EXISTING APPLICATIONS

This application claims the benefit of U.S. Provisional Patent Application No. 60/847,613 filed Sep. 28, 2006, the contents of which are hereby incorporated by reference.

FIELD AND BACKGROUND OF THE INVENTION

The present invention relates to an apparatus and method for managing storage of data elements, and more particularly, but not exclusively to an apparatus and method for managing the distribution of data elements across a number of storage devices.

To date, digital data to which rapid and accurate access by large numbers of users is required, may be stored in autonomous or distributed databases. An autonomous database is stored on an autonomous storage device, such as a hard disk drive (HDD) that is electronically associated with a hosting computing unit. A distributed database is stored on a distributed database that comprises a number of distributed storage devices, which are connected to one another by a high-speed connection.

The distributed databases are hosted by the distributed storage devices, which are positioned either in a common geographical location or at remote locations from one another.

A distributed database that is hosted in storage devices which are distributed at different locations, allows the database operator to assimilate backup solutions, such as a disaster recovery plan (DRP) sometimes referred to as a business continuity plan (BCP) or business process contingency plan (BPCP), which assure that should a disaster happens at one of the locations of the storage devices, the records that are hosted in the related storage device will continue to be available on another storage device that is placed in another location. It should be noted that an access to a record of the distributed database that is remotely located incurs high latency and is therefore provided only after a relatively high response time.

An example for a distributed data storage system that allows the database operator to assimilate backup solutions is provided in United States Patent Application number 2003/0187853, published in Oct. 2, 2003 that discloses a distributed data storage system and method comprising a highly integrated mass storage controller system permitting distributed management and control of data storage. The teaching permits mass storage media to be made available on a network in a fashion to permit global access, while automatically handling many high-level file access and data integrity/security/control functions normally associated with a host operating system. This integration and redistribution of functionality permits spatial diversification of data resources, automatic mirroring of data, fault isolation, data security, and a plethora of other control functions to be integrated into the mass storage device. This integration permits peer-to-peer communication between mass storage devices to both unburden the host data consumers but also isolate the data management functions from the data presentation functions normally associated with host systems. Exemplary embodiments of the present invention as applied to specific preferred system contexts include but are not limited to distributed data storage in a networked environment, brokered data access metering, database access/control, data backup, journaling, checkpointing, and automated software distribution.

Another example is provided in United States Patent Application number 2004/0073835, published Apr. 15, 2004 that discloses a system having both load sharing structure and a primary/backup structure. The system has a primary unit mounted on each sub-system to share load according to load sharing processing order for events, a backup unit mounted on each sub-system to receive and store minimum data only necessary for restoration from the primary unit. The data is stored in the backup unit of a predetermined sub-system, a configuration management unit, a distributed algorithm processing unit, a shared resource, an event, and a distributed control environment.

SUMMARY OF THE INVENTION

According to one aspect of the present invention there is provided a geographically distributed storage system for managing the distribution of a plurality of data elements. The geographically distributed storage system comprises a plurality of geographically distributed sites, each comprises a site storage unit configured for locally storing a portion of a globally coherent distributed database comprises the plurality of data elements and a local access point configured for receiving requests relating to ones of the plurality of data elements. The system further comprises a data management module configured for forwarding requested data elements to the local access point at a first of the plurality of geographically distributed sites from which the request is received and storing the requested data elements at the first site, thereby to provide local accessibility to the data element for future requests from the first site while maintaining the global coherency of the globally coherent distributed database.

Preferably, each the site storage unit comprises a local storage sub-system configured for locally storing respective the portion.

Preferably, each the site storage unit comprises a global storage device of a dynamic storage sub-system, the dynamic storage sub-system being configured for storing at least a unified database that comprises a replica of each the data element.

Preferably, the data management module is configured for forwarding the requested data elements while maintaining a predefined atomicity, consistency, isolation, and durability (ACID) level of the globally coherent distributed database.

Preferably, the requested data elements are replied without communication latency to subsequent requests following the requests.

More preferably, the unified database backing up one the plurality of elements of each the local storage sub-system.

More preferably, each the data element comprises a tag indicative of one of the storage sub-systems, an access right to each the data element is exclusively granted to a respectively indicated sub-system.

More preferably, the access right comprises one member of the group consisting of: read, write, edit, lock, and replicate.

Preferably, the sites are respectively located remotely thereby to ensure a geography-based resilience.

Preferably, the local access point is configured for receiving a request for a cluster that comprises data elements from the plurality of data elements, the data management module being configured for forwarding the cluster to the local access point at a first of the plurality of geographically distributed sites from which the request is received.

More preferably, at least some of the data elements are associated with respective entity identifiers, each member of the cluster having a common entity identifier.

More preferably, at least some of the data elements are associated with a plurality of criteria, the request being for ones of the plurality of data elements, which fulfill one or more of the criteria.

More preferably, the plurality of data elements comprises a cluster of frequently requested data elements, each the local storage sub-system being configured for caching the cluster.

More preferably, each the local storage sub-system is configured for receiving a plurality of requests such as the request; further comprises a statistic module configured for updating the locally stored data elements according to a statistical analysis of the plurality of requests.

Preferably, each the access point is configured for interfacing with a roaming management system, each the data element stores information needed for providing roaming services.

Preferably, the geographically distributed storage system further comprises a blocking module having a list of blocked data elements, the blocking module being configured for preventing the local access point points from providing the requested data elements.

More preferably, each the local storage sub-system is configured for restoring the locally stored the data elements according to respective data elements of the unified database.

Preferably, the data management module is configured for identifying the type of the request, wherein the access rights of the forwarded requested data elements are determined according to the type.

According to one aspect of the present invention there is provided a method for managing requests for a plurality of data elements distributed over a plurality of sites. The method comprises a) distributing a plurality of local databases in a plurality of sites, each the local database stores a portion of a globally coherent distributed database that includes a plurality of data elements, b) receiving a request for one or more of the plurality of data elements from a database client at a first site of the plurality of sites, c) forwarding the requested one or more data element to the database client from a hosting site of the plurality of sites, and d) locally storing the requested one or more data element at the first site, thereby providing local access to the requested one or more data element at the first site while maintaining the global coherency of the distributed database.

Preferably, the distributing ensures a geography-based resilience.

Preferably, the request is for a cluster that comprises data elements from the plurality of data elements, the forwarding comprises forwarding the cluster to the database client.

Preferably, the locally storing provides local accessibility to the requested one or more data element for future requests from the first site.

According to one aspect of the present invention there is provided a distributed storage system for managing the distribution of a plurality of data elements wherein requests for given data elements incur a local inertia. The system comprises a plurality of distributed units, each comprises a storage subunit configured for locally storing a portion of a coherent distributed database comprises the plurality of data elements and a direct access point configured for receiving requests relating to ones of the plurality of data elements. The system further comprises a data management module configured for forwarding one or more requested data element to the direct access point at a first of the plurality of distributed units from which the request is received and storing the one or more requested data element at the first unit, thereby to provide direct accessibility to the data element for future requests from the first unit while maintaining the coherency of the coherent distributed database.

Preferably, the data management module is configured for forwarding the one or more requested data element while maintaining a predefined atomicity, consistency, isolation, and durability (ACID) level of the coherent distributed database.

Preferably, the one or more requested data element is replied without communication latency to one or more subsequent request following the request.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

The present embodiments provide, inter alia, a geographically distributed storage system, optionally dynamic, that is distributed over multiple sites for storing a number of data elements. The storage system combines the ability to respond substantially immediately without communication latency while retaining characteristics such as geographical resiliency, large-scale online scalability, continuous availability, coherency requirements, and consistency requirements. The system is designed to improve efficiency in the case where there is a tendency to geographic inertia. That is to say, as will be explained below, certain data requests in some systems tend to be made from the same location for a period.

According to one embodiment of the present invention, there are provided a storage system and a method for storing data elements in different locations, optionally in a manner that ensures resilience, while generating replicas of the data elements on-demand using caching techniques. The data elements are provided on-demand and stored as close as possible geographically to a new demanding entity, so that future requests from the same location meet real-time responsiveness without incurring repetitive network latency. The storage system comprises a distributed storage sub-system, which may be referred to as a global storage sub-system that includes a number of storage devices hosted in a number of different sites and connected with one another via a network. Optionally, each one of the local storage sub-systems stores a local database and a global storage sub-system stores a global database, which is at least a unification of the entire local database.

The storage system further comprises local sub-systems, which are distributed across the different sites and a data management module that is used for managing the distribution of the data elements across the storage devices. Optionally, each one of the local storage devices stores a local database and the global storage sub-system stores a unified database that is an aggregation of one or more of the local databases, typically all of the local databases. The storage system allows a database client at one site to access and to edit data elements which have been originally associated with another site. If the database client requests access to a certain data element that is locally stored on the local database at the database client's site, it receives direct access thereto. However, if the certain data element is stored on another database, the storage system supports the transfer of the requested data element to the site of the requesting database client, and thereby assures that the following request to the transferred data element from this site is replied to without communication latency.

Optionally, the storage system manages an ownership process that ensures that all the replicas of each one of the data elements remain consistent and/or coherent after an update is made. Optionally, each one of the replicas of a certain data element includes an ownership tag. The ownership tag indicates which one of the sub-systems currently controls the data element. Optionally, the control allows the indicated sub-system to access and/or edit the indicated data elements. Optionally, the storage system updates and/or deletes replicas of the indicative data elements, which are not up-to-date, from other local sub-systems.

The principles and operation of a system and method according to the present invention may be better understood with reference to the drawings and accompanying description.

Before explaining at least one embodiment of the invention in detail, it is to be understood that the invention is not limited in its database client to the details of construction and the arrangement of the components set forth in the following description or illustrated in the drawings. The invention is capable of other embodiments or of being practiced or carried out in various ways. In addition, it is to be understood that the phraseology and terminology employed herein is for the purpose of description and should not be regarded as limiting.

According to one aspect of the present invention, the location of the stored data is flexible in a distributed database. Elements of data can independently be relocated to different sites, which may be positioned in different locations, in respect to a certain policy, which is required for the data element, as described below. As described below, such roaming of data elements from one site to another is determined according to one or more policies.

It should be noted that the term roaming or roam is used in this description and the following sections to, inter alia, denote transferring a data element from a one storage device of the global storage sub-system to another storage device of the global storage sub-system. It should be noted that the transfer may be determined according to the characteristics of the content if the data element, such as structure and size. In such an embodiment, different policies may be employed for different elements of data.

Figure 1:
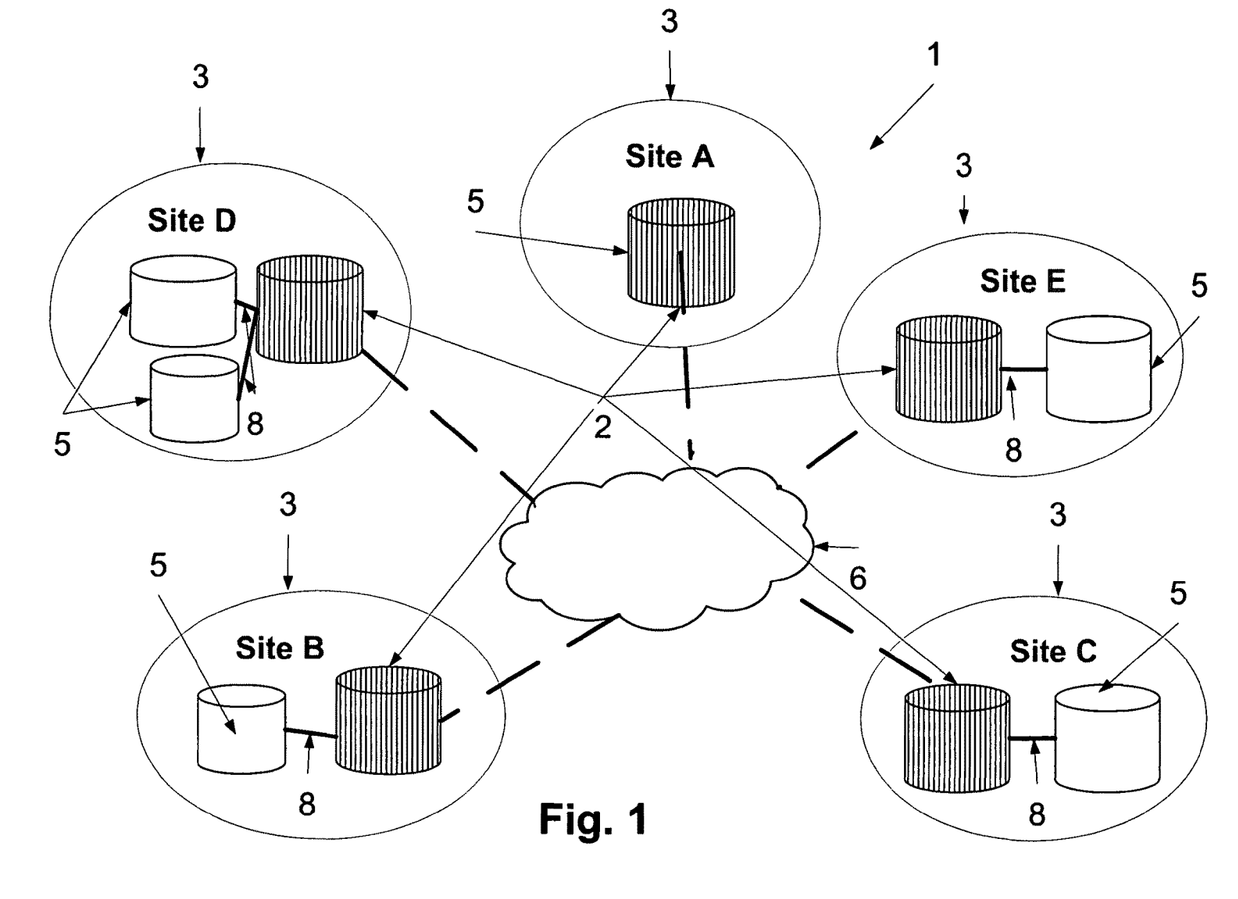
FIG. 1 is a schematic illustration of geographically distributed sites of a geographically distributed storage system, according to a preferred embodiment of the present invention.

Reference is now made to FIG. 1, which is a schematic illustration of a storage system 1 that is distributed across different sites 3, which may be understood as data storage sites 3, such as the exemplary sites A, B, C, D and E, according to an embodiment of the present invention.

The geographically distributed storage system 1 is designed to manage the distribution of a globally coherent distributed database that includes plurality of data elements, wherein requests for given data elements incur a geographic inertia. It should be noted that globally coherency may be understood as the ability to provide the same data element to a requesting unit, regardless to the site from which the requesting unit requests it. A globally coherent distributed database may be understood as a distributed database with the ability to provide the same one or more of its data elements to a requesting unit, regardless to the site from which the requesting unit requests it.

The distribution is managed in a manner that reduces the number of data retrievals with high geographical communication latency which are needed to allow a number of remotely located database clients to receive access to the plurality of data elements. A geographic inertia may be understood as a tendency to receive requests to access a certain data element from a locality X whenever a preceding request for the certain data element has been identified from the locality X. That is to say a request for data at one time from a given location is a good prediction that a next request for the same data will come from the same location.

The distributed storage system 1 comprises geographically distributed sites with local site storage units, which may be referred to as sites 3. Each one of the sites 3 stores a local database that contains one or more of the data elements of the globally coherent distributed database, which may be referred to as a global database. The global database includes the data elements which are stored in the local databases of the site storage units 3. Each site storage unit is connected to a local access point that receives requests to access the data elements of the global database from local database clients. The storage system 1 manages the distribution of the data elements across the sites 3 in a manner that reduces the number of data retrievals with high geographical communication latency. Geographical communication latency may be understood as the time that is needed for a site to acquire and/or access one or more data elements from a remote destination site that hosts the requested data elements.

Optionally, as depicted in FIG. 1, each site 3 comprises a storage device of a dynamic data storage unit 2, which may be referred to as a global storage sub-system 2 and a local data storage sub-system 5 are distributed across a computer network 6, such as a wide area network (WAN), for example the internet. Each local data storage sub-system 5 stores a local database. Each storage device stores a portion of the data elements, which are stored in the dynamic data storage unit 2.

The global storage sub-system 2 includes a unified database of the local databases, which are stored in the local data storage sub-systems 5, optionally in a manner that ensures geography-based resilience. Optionally, the unified database is at least a unification of the local databases. In one exemplary system, each one of the local data storage sub-system 5 stores data elements in several storage devices which are connected to one another via a local area network (LAN). Optionally, each local database hosts three replicas of each data element it hosts. Such replicas minimize the latency and provide some component failure resilience, as described below. Each data element, which is stored on one of the local data storage sub-systems 5, is also stored in the global storage sub-system 2. Preferably, each data element is distributed across a number of distinct sites over the global storage sub-system 2. The distinct sites are preferably remotely located in a manner that ensures recovery in case of a regional disaster. It should be noted that though FIG. 1 depicts four sites, the global storage sub-system 2 may be distributed over more than four sites, for example in large-scale systems or in systems which require high availability.

As the global storage sub-system 2 stores a replica of each one of the local databases, it provides a unified single logical view that unifies the data elements of which are stored in the local data storage sub-systems 5. A data element may be understood as a record, a value, a list, a string, information, a database record, a set of data elements, or any other entity with certain field values. The storage devices, which are used by the global storage sub-system 2, are connected to one another via the computer network 6 or a LAN, for example an Ethernet. The global storage sub-system 2 may be scaled to store any number of data elements, as it is not limited to a predefined number of storage devices or sites. Such scaling up ability allows the distributed storage system 1 to support large-scale implementations, such as banking and communication. The data elements are optionally dynamic and may be used for storing records such as subscriber records of wireless communication networks or financial records of a financial transaction processing system or any other banking system.

Optionally, the local data storage sub-system 5 comprises a set of local storage devices and/or one or more local routers. In each one of the sites 3, the data elements of the local and the global sub-systems 2, 5 may be hosted on separate storage devices or on a common storage device.

Each one of the local data storage sub-systems 5 is connected to the global storage sub-system 2 in a connection 8 that supports ownership transfer, as further described below. An ownership transfer occurs whenever a local database client submits a request to access a remotely located data element. A remotely located data element may be understood as a data element that is not stored in the local data storage sub-system 5 or in the storage device of the global storage sub-system 2 that share a common site with the requesting database client.

Optionally, the global storage sub-system 2 stores N replicas of each data element, where N denotes a specified resiliency level. Optionally, $M_x$ additional replicas of each data element may be stored at one or more of the X local data storage sub-system 5, where M denotes a specified resiliency level, X denotes the number of local data sub-systems, and $M_x$ denotes the resiliency level of local data storage X. Optionally, $M_x$=N and the distributed storage system 1 has 2N replicas of each data element. It should be noted that the number of replicas to be stored in the global storage sub-system 2 is independent of the number of sites 3 or the number of local data storage sub-systems 5.

In one embodiment of the present invention, the sites 3 are remotely located from one another. In such an embodiment, the global storage sub-system 2 may implement a disaster recovery plan (DRP) for regaining access to the stored data elements, thereby to resume at least critical operations of the distributed storage system 1, after a natural and/or human-induced disaster.

Figure 2:
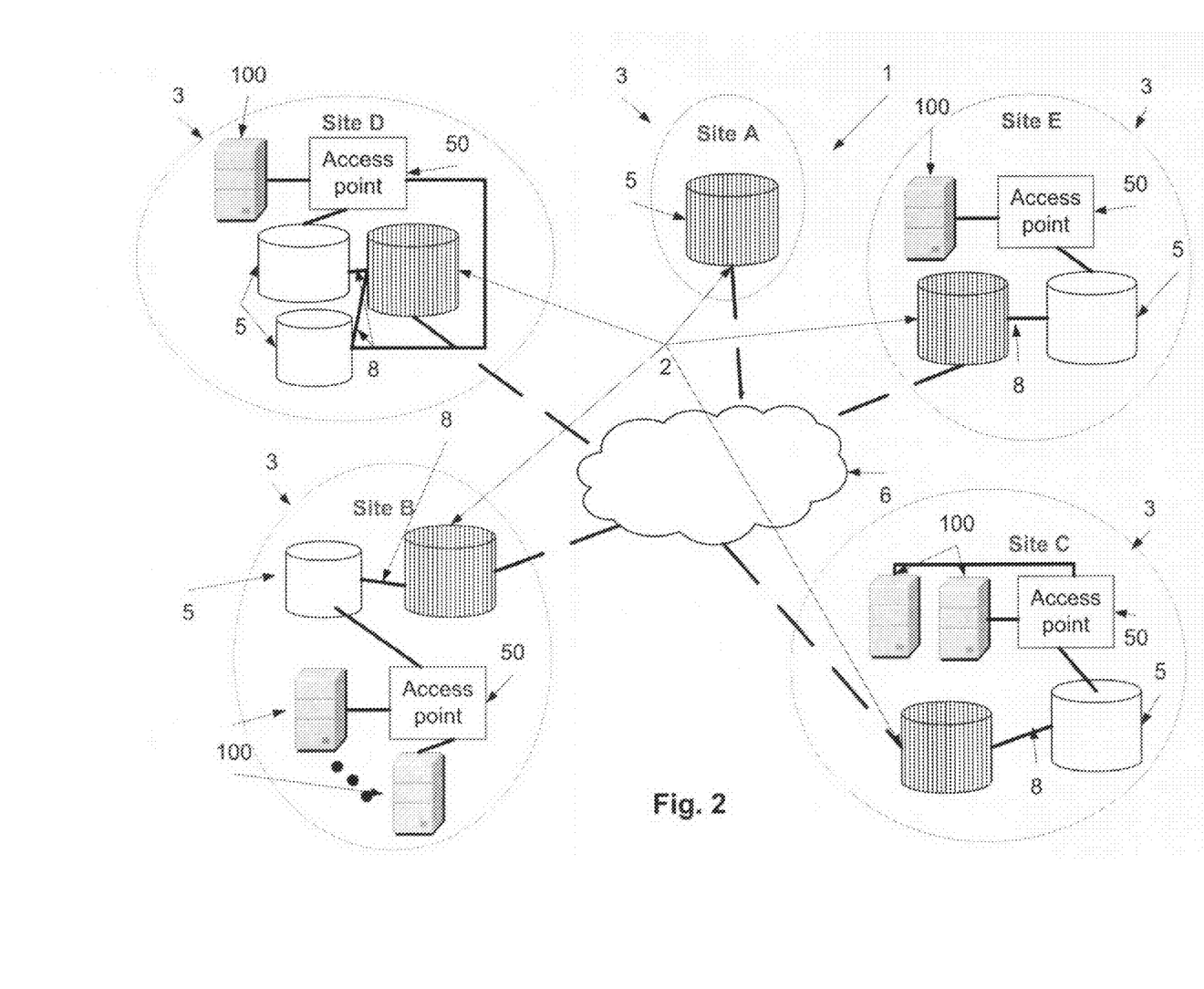
FIG. 2 is a schematic illustration of the distributed system that is depicted in FIG. 1 and a number of access points, according to an embodiment of the present invention.

Reference is now made to FIG. 2, which is a schematic illustration of the distributed system 1 that is depicted in FIG. 1 and a number of access points 50 that allow database clients to submit a request to access one of the data elements, according to an embodiment of the present invention. The distributed storage system 1 serves database clients 100, which are hosted in the sites 3. An access point may be understood as a router, an interfacing module, a network switch, a gateway device, or any network node equipped for interfacing between the local data storage units 5 and the database clients 100.

The access points 50 allow the database clients 100 to submit a request for accessing and/or acquiring one of the data elements and to access and/or to acquire the requested data element therefrom. Such a request may be an access request to read, write, edit, lock, and replicate one or more of the data elements and/or replicas. The request is optionally based on structured query language (SQL) and/or lightweight directory access protocol (LDAP) queries.

Each one of the access points 50 optionally parses the received request, creates new queries according to the received request, performs execution plans, and/or manages the quality of service (QoS) of the retrieving of the data elements. The execution plans are performed by forwarding the request and/or segments thereof, such as sub-queries, to the neighboring local sub system. The local sub system provides the requested data elements and/or segments or forwards the request to the storage sub system where the requested data element physically reside, as described below.

As further described below, if the requested data elements are cached in the local data storage sub-system 5 of a given site and requested from an access point at the same site, they are provided without the latency usually associated with a network retrieval. It should be noted that a cached data element may be understood as a data element that is locally stored in one of the local storage sub-systems 5.

However, if the requested data elements are not locally cached in the local data storage sub-system 5 but are requested from an access point 50 that is located in another site, the requested data is instead retrieved from the global database and may yield such latency.

Data elements which are retrieved from a local database, are retrieved with relatively low-latency. The distributed storage system 1 may provide data elements from the local data storage sub-system 5 to the accessing database client 100 within a time that is significantly shorter than the time that is needed for providing similar data elements from another site, via the network 6. Briefly stated, the distributed storage system 1 provides a database client 100 in a certain site with substantially immediate responsiveness to direct accesses to the locally stored data elements. A substantially immediate responsiveness may be understood as a responsiveness of a typical LAN-based database or a database spread over a small area. Such a capability generates major latency benefits without the penalties of lack of coherence.

A database client 100 that is hosted in a certain site, such as site A, may submit a request to access a data element to the aforementioned access point 50. As further described below, such an access request may lead either to a local access to one of the data elements, which are locally stored in the site of the requesting database client or trigger a network retrieval from one of the other sites 3, as described below.

Figure 3:
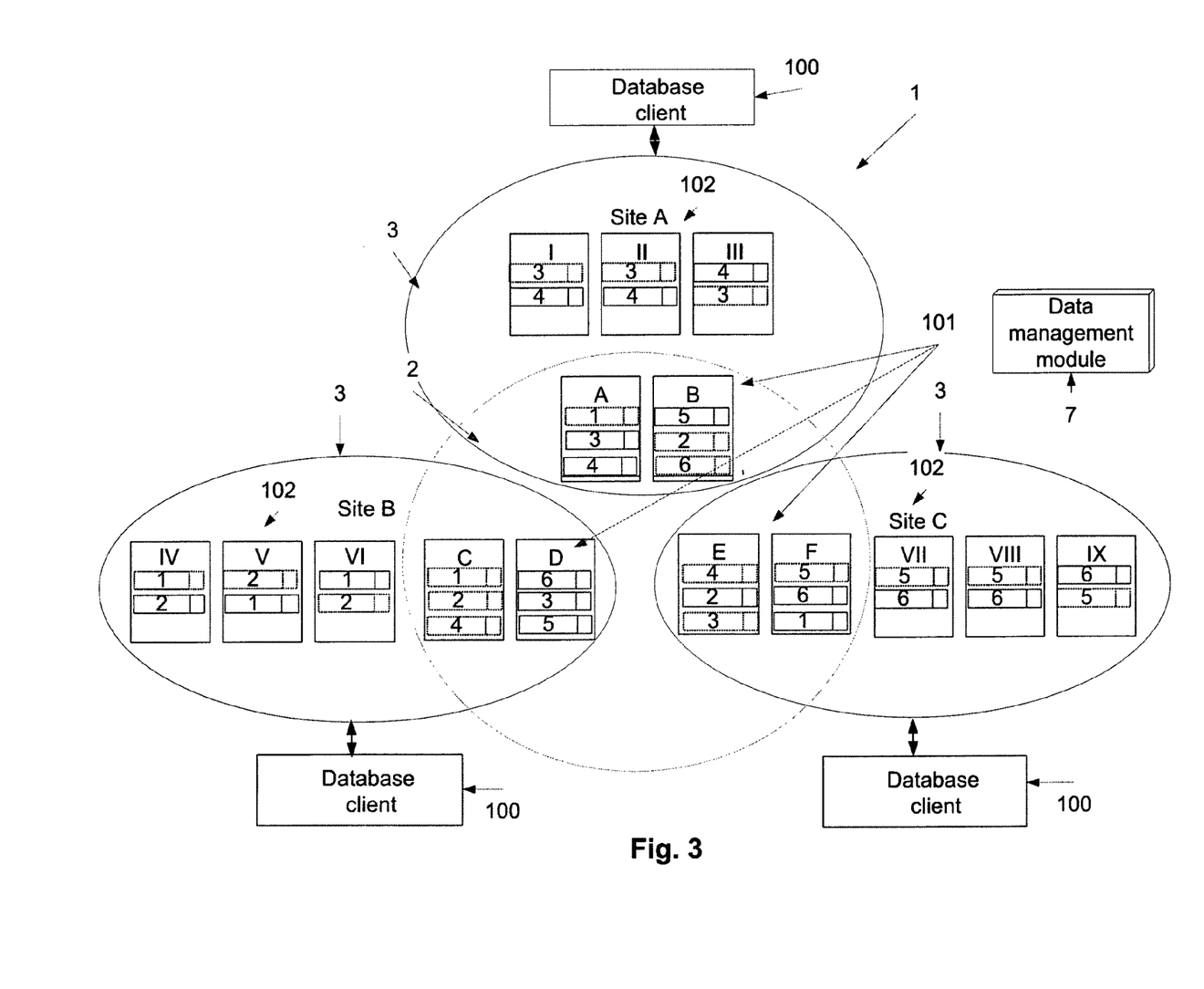
FIG. 3 is a schematic illustration of an exemplary distribution of data elements across the sites that host the distributed system, according to one embodiment of the present invention.

Reference is now made to FIG. 3, which is a schematic illustration of an exemplary distribution of data elements across the sites 3, according to one embodiment of the present invention. The global storage sub-system 2, the sites 3 and the network 6 are as depicted in FIG. 1. However, FIG. 3 further depicts a number of local database clients 100, exemplary data elements 101 in exemplary data clusters A-F, which are stored in the global storage sub-system 2, a data management module 7 and exemplary data elements 1-9 102 in exemplary data clusters I-IX, which are stored in the local databases 2.

As described above, the distributed storage system 1 provides real-time responsiveness to access requests of database clients 100 of a certain site 3 to access data elements 101 and replicas 102, which are locally stored on the certain site 3. For example, a database client at site A that sends an access request to read a data element that is locally stored at site A receives a direct access thereto. However, if the same database client sends an access request to read a data element that is stored at sites B and/or C, the retrieval of the requested data element imposes geographical communication latency on the reply as data is acquired via the network from a remote site.

In order to allow the database client 100, in a certain site, to use a data element of the global storage sub-system 2 without the latency that is involved in a network retrieval that is needed for acquiring and/or accessing the element, the requested data elements have to be locally stored on the site of the requesting database client.

The distributed system 1 implements, optionally using a data management module, a synchronization process, such as a synchronization protocol that redistributes the data elements of the global storage sub-system 2 across the sites 3 in order to obtain real-time responsiveness to local access requests from the database clients. The synchronization process assumes that geographical data affinity of a data element is a dynamic characteristic that changes over time according to the requests of the database clients 100.

Optionally, the synchronization process is based on data roaming wherein data elements from one site are transferred to another site. When a request for a certain data element is received at one of the sites from a database client that is connected to the distributed storage system 1, the data management module 7 manages the roaming of the certain data element to the site that hosts the requesting database client. For example, once a request to a certain data element is received at one of the sites 3 that does not store a replica and/or an up-to-date replica of the certain data element, the distributed storage system 1 automatically creates a related replica at the requesting site and deletes the replica of the certain data element from its previous location.

As described above, the global storage sub-system 2 and each one of the local data storage sub-systems 5 may cache a number of replicas of the same data element. Optionally, in order to assure coherency among replicas of a certain data element, only one of the local data storage sub-systems 5 and the global storage sub-system 2 is assigned to control the certain data element at any given moment. Control may be understood as the ability to edit, update, and or delete the data element.

Optionally, a tag is attached to each one of the data elements. Optionally, the tag, which may be referred to as an ownership tag, states which one of the databases, which may be one of the local data storage sub-systems 5 or the global storage sub-system 2, currently controls the data element.

In such an embodiment, though replicas of a certain data element may be stored in more than one storage sub-system, each data element is controlled by a single storage sub-system at each point in time. Optionally, the data management module 7 is responsible for granting and/or revoking control over a certain data element to one of the databases, according to the received requests. For example, once a request to access a certain data element is received, the distributed storage system 1 automatically creates a replica of the requested data element at the local database at the site of the requesting database client, tags the replica with an ownership tag that indicates the requesting site, and updates the ownership tag of all the other replicas of the requested data element to indicate that the requesting site has control over the requested record, as further described below. The tagging of the data elements allows the distributed storage system 1 to manage the databases of the storage units 2, 5 in a manner that the geographical data affinity of the data elements is a dynamic characteristic that changes over time, according to the requests of the database clients 100.

As described above, a number of replicas of each data element may be distributed across the databases of the storage units 2, 5, where each replica has an ownership tag that marks which one of the storage units 2, 5 currently controls the related data element. Optionally, the data management module 7 changes the ownership tags to indicate a new controlling database. In such an embodiment, the control on the data element and not the data element itself is transferred between two storage units that host a replica of the data element.

As described above, the data management module 7 is responsible for synchronizing between the local and global databases 5, 2 of the distributed storage system 1. The synchronization is bi-directional and optionally triggered by an access request that is received at one of the sites from one of the database clients. Optionally, the synchronization is adjusted according to one or more parameters, such as:

a) Whether the access request is performed directly and/or independently at the site or not.

b) Whether the incoming request is performed on one of the local data storage sub-systems 5 or the global storage sub-system 2 or not.

c) Whether the request is to create a new data cluster or to update an existing cluster or not, as further described below.

As described above, when a database client user requests a certain data element, the distributed storage system 1 supports the roaming of the requested data element to the site of the requesting database client. The requested data element is not merely retrieved but is also now stored locally at the site of the requesting database client. In such a manner, any subsequent requests for the same data from the same location are handled locally and the latency, which is caused by the network retrieval of the requested data element, is reduced. The system brings about a reduction in latency in cases where there is a geographic profile to data element requests. That is to say the system helps in circumstances in which the location of a previous request is a good prediction of the location of a next request for the same element.

Figure 4:
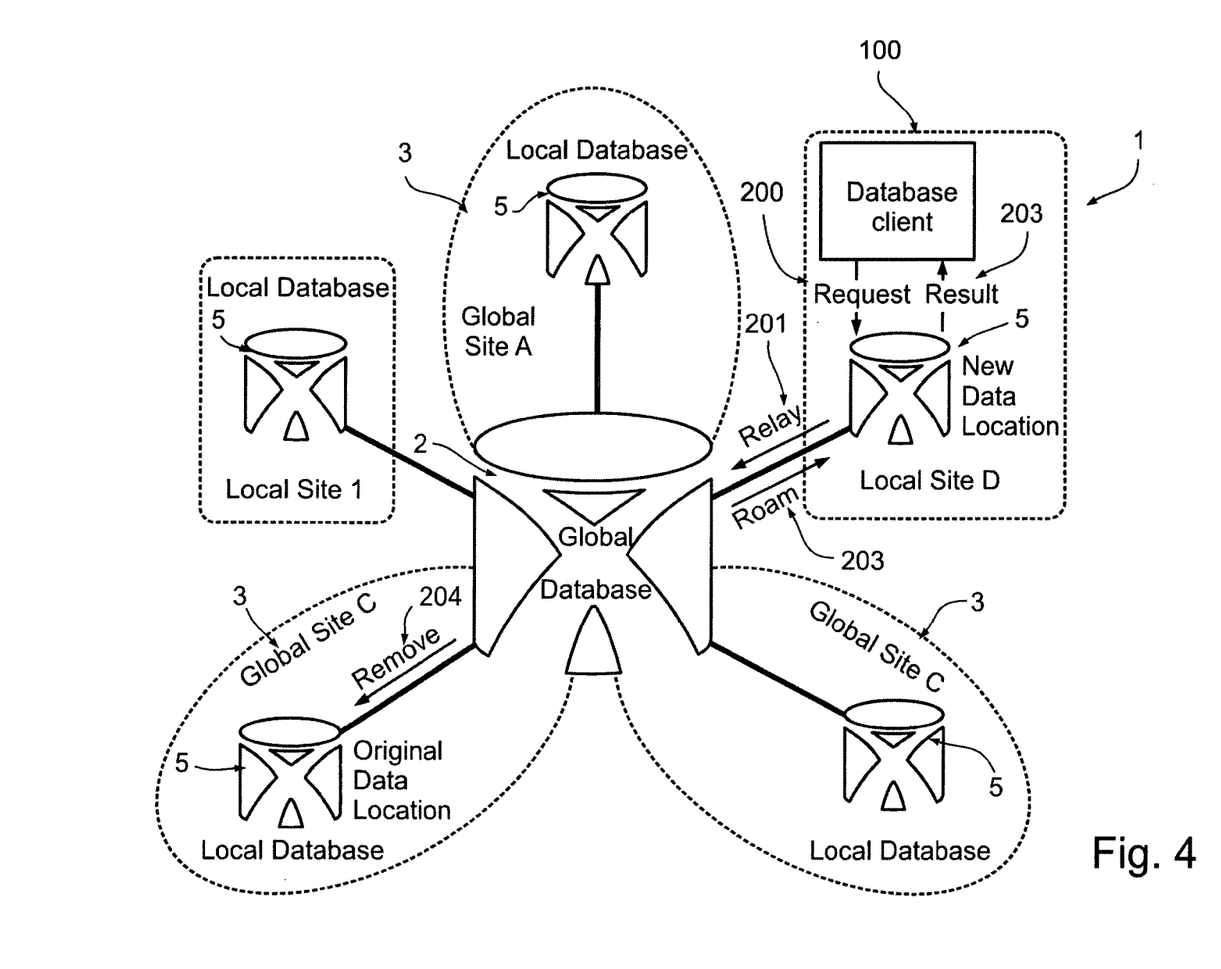
FIG. 4 is a schematic illustration of a distributed storage system that supports public land mobile networks systems, according to one embodiment of the present invention.

Reference is now made to FIG. 4, which is a schematic illustration of a distributed storage system 1 that supports public land mobile networks (PLMN) systems, according to one embodiment of the present invention. PLMN systems are an example of a system in which data retrieval may have with communication latency. The global storage sub-system 2, the sites 3, the database clients 100 and the network 6 are as depicted in FIG. 3. However, FIG. 4 depicts the implantation of the data roaming process in a distributed storage system 1 that manages the roaming of PLMN subscribers, according to one embodiment of the present invention.

Subscribers of PLMN, such as mobile communications (GSM) networks, receive voice and data services while they are traveling within the network coverage area and/or when they roam to the coverage area of another network. To guarantee the timely and accurate delivery of incoming calls to a subscriber, a PLMN must be able to track the current location of each mobile terminal. This tracking procedure is commonly referred to as location management. The location management entails the recordation of up-to-date information, such as location information regarding each mobile terminal in a distributed network of databases, such as location databases.

In the system depicted in FIG. 4, each data element stores information that is needed in order to allow the hosting PLMN operator to provide voice and/or data services to a certain PLMN subscriber. In order to allow the hosting PLMN operator to provide roaming subscribers with voice and data services without incurring communication latency, all the related data elements have to be stored on the site 3 of the PLMN operator.

As described above, FIG. 4 depicts the implantation of the data roaming process in a system that is used for supporting the roaming of PLMN subscribers. When a subscriber, previously connected to a certain PLMN network such as a PLMN network in site C, attempts to connect to a PLMN network found on another site, such as site D, the local database client of the PLMN network at site D submits a request 200 for one or more data elements, which are needed to provide voice service and/or data for the subscriber. If the data is not available in the local storage unit at site D, the request is relayed 201 to the global storage sub-system 2. As shown at 203, the data management module 7, which optionally manages the roaming of the data elements and/or the ownership transfer, replies with the requested data element. Optionally, data management module 7 removes 204 the requested data element from its original location and transfers it to one of the storage devices of the global storage sub-system 2 at site D. In addition, the data management module 7 updates the ownership tags of all the replicas of the requested data element and/or deletes them from sites A-C. The local data storage sub-system 5 that is located on site D handles all subsequent requests for this data element. In such a manner, when a subscriber of a certain PLMN operator roams onto the coverage area of a temporary PLMN operator, the information, which is needed for providing her with voice and data services, is redistributed using the global storage sub-system 2 and stored locally at the site of the temporary PLMN operator. When the roaming subscriber returns to the coverage area of the certain PLMN operator, the information, which is needed for providing her with voice and data services, roams back with her.

The data element or cluster of data element, as described below, is associated with a certain subscriber and contains subscriber-centric data. The data container contains a subscriber ID, which may be referred to as a cluster key, by which the data is clustered. Optionally, SQL and/or LDAP extensions define the cluster key. Optionally, the cluster key allows the identifying of the requested data elements in a hash table that is stored in the access point and used to document the distribution of the data elements across the sites.

Optionally, the cluster is defined according to the object management group transaction service (OTS) specifications, which are incorporated herein by reference. Optionally, the transactions, which are made with the cluster, maintain the atomicity, consistency, isolation, and durability (ACID) of the cluster in a manner that guarantees that all the database transactions are processed in a reliable manner.

Optionally, each data element is stored separately. Optionally, the global storage sub-system 2 supports the storage of non-clustered data. Such a structure assumes that each data element is managed independently and that no data clustering is required.

Figure 5:
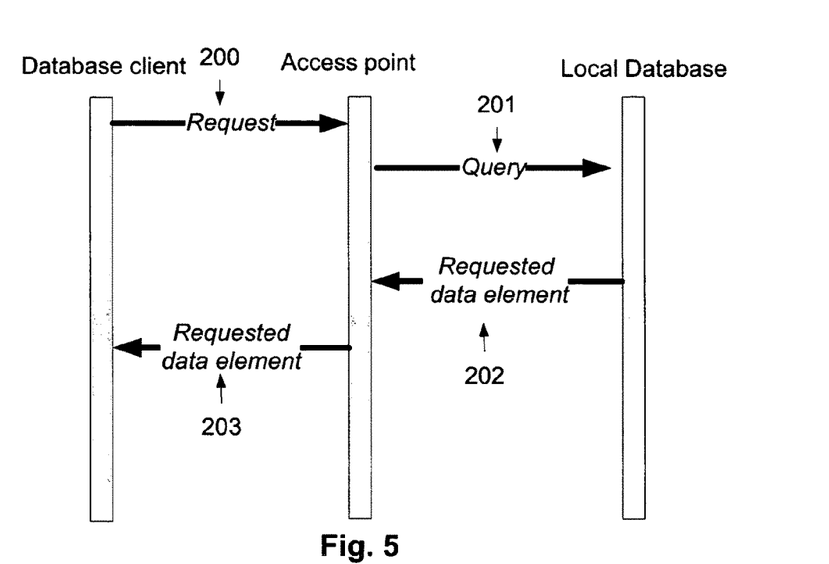
FIGS. 5, 6, and 7, which are sequence diagrams of a set of logical steps performed during the processing of a request, according to one embodiment of the present invention.
Figure 6:
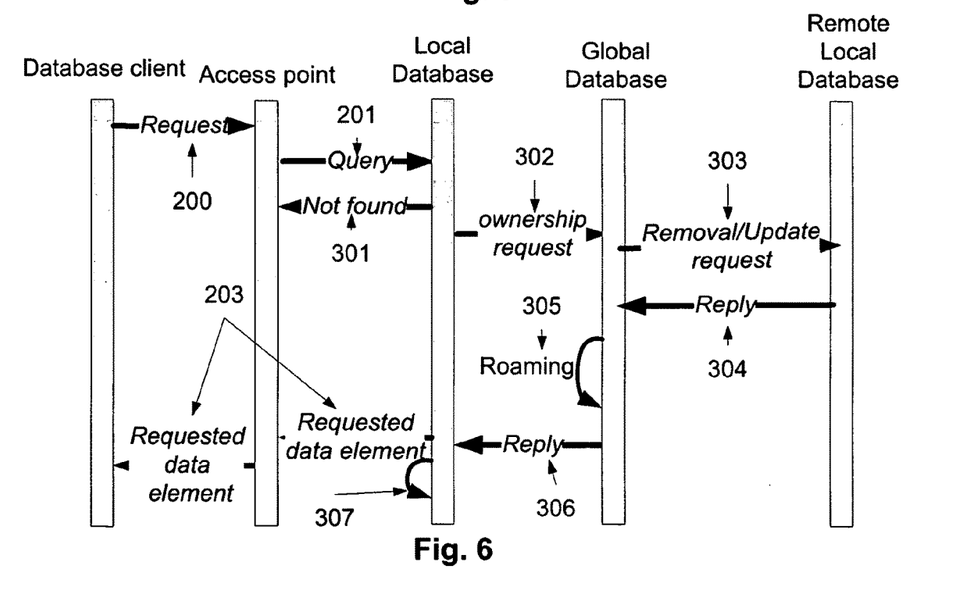
Figure 7:
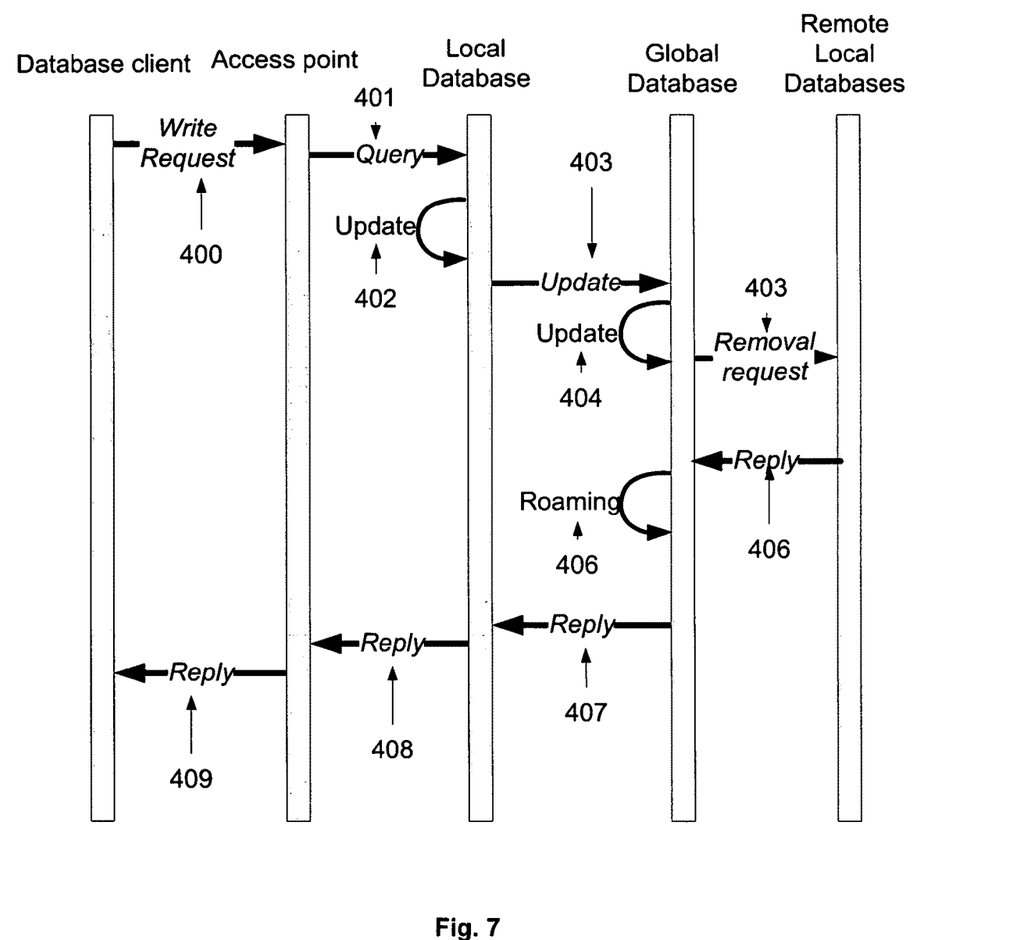

Reference is now made to FIGS. 5, 6, and 7, which are sequence diagrams showing data flows during requests. Each defines a set of logical steps performed during the processing of a read or write request, according to an embodiment of the present invention.

As described above, the distributed system has an access point in a number of sites. In FIG. 5, the database client submits a request to read a certain data element that is locally hosted in the databases of the requesting client's site. First, as shown at 200, the database client connects to the access point and submits a request that optionally include SQL and/or LDAP queries. The access point receives and analyzes the request and sends it to one or more sites 3 that host replicas of the requested data element, as shown at 201. Optionally, the access point is designed to implement a majority-voting process in order to ensure the accuracy of the reply, as further described below.

As shown at 202, the access point receives the requested data element. In certain cases, more than one replica or replica of the element may be received, and not all are necessarily identical. In the case that some replicas are different, majority voting is used to select a single version for retrieval.

It should be noted that a majority-based decision may ensure that the reply is not delayed or blocked if one of the databases fails to provide a transaction acknowledgement in a timely manner. In such an embodiment, the receiving access point takes the majority based decision after a predefined timeout period, even if the receiving site did not receive all the replicas of the requested data element.

Now, as shown at 203, the access point may forward the requested data element to the requesting database client. Optionally, if a majority-voting process is applied, the access point sends a reply to the requesting database client with a version that is selected by the majority voting process.

In FIG. 6, the database client submits a request to read a certain data element that is not hosted locally in the same site with the requesting database client. As described above, if the request is received at a local storage device that does not own the requested element data, the request initiates, if needed, the roaming of the requested data element in the global storage sub-system 2 and an ownership transfer.

As depicted in FIG. 5, the process is triggered when the access point receives a request from a local database client, as shown at 200. Then, as shown at 201, the access point establishes a connection with the local database. As the requested data element is not locally hosted at the local data storage sub-system 5, the access point receives a notification, such as a failure notification, as shown at 301. Then, the local database establishes a connection with the global database and requests for the initiation of an ownership change, as shown at 302. If the requested data element is stored in the global database, no ownership change is performed and the data management module supports the roaming of the requested data element to the site of the requesting database client, as described above. Optionally, the data management module relays a request to one or more of the local data storage sub-systems 5. The request includes instructions to update the ownership tag of the locally cached replicas of the requested data element or to delete them, as shown at 303. The reply to the ownership change request, which optionally includes the requested data element, is transferred to the global database, as shown at 304. Now, after the read request has been performed, the data element may roam to the site of the requesting database client, as shown at 305. The global storage sub-system provides the local storage unit with the requested data element, as shown at 306. This step allows the local database at the site of the access point to cache a replica of the requested data element, as shown at 307. Now, as shown at 203 and described above, the access point may forward the requested data element to the requesting database client.

Optionally, the storage units follows a distributed algorithm that allows it to commit a robust ownership transaction, such as a two-phase commit protocol (2PC) and/or a three-phase commit protocol (3PC), which is implemented during the processing of the requests, for example as described in Skeen, D. (May 1983). "A Formal Model of Crash Recovery in a Distributed System". *IEEE Transactions on Software Engineering* 9 (3): 219-228, which is incorporated herein by reference.

The processes, which are depicted in FIGS. 5 and 6, involve read requests. An update request to a local database that owns the data, which may be understood as a write request, will result in an update on the local database, and an asynchronous or synchronous propagation of the update to the global database and optionally to the local database. Optionally, if the update is performed on a data element that is controlled by the global database, no subsequent data synchronization is performed.

In FIG. 7, an update request to change a data element stored at a local database is submitted locally. As shown at 400, the database client sends a write request to a data element that is stored at the local database. Optionally, the access point parses the write request, creates one or more instructions according to the request, and, as shown at 401, forwards the instructions to the local database that updates the related data element accordingly, as shown at 402. Then, as shown at 403, a request to update the related data element is forwarded by the local storage unit to the global storage sub-system, optionally in an asynchronous manner. As shown at 404, the global database updates the data element according to the received write request, optionally using the aforementioned 3PC distributed algorithm. As described above, replicas of the data element may be stored in more than one local database. Optionally, in order to maintain the coherency among replicas of the updated data elements, the global database sends either a remove request or an update request to all or some of the local databases. As shown at 405, the local databases send a reply that states whether the transaction was successful. Now, after the write request has been performed, the data element may roam a storage device of the global storage sub-system 2 at the site of the requesting database client, as shown at 406, if it is not already located there. Clearly, the roaming takes place only if the data element is not locally stored at the same site as the requesting database client. Now, as shown at 407, the global database sends a status reply to the local database. The local database optionally sends a respective status reply to the access point 408 that defines whether the requested data element has been updated or not. The access point 408 optionally sends a respective status reply to the requesting database client 409.

One of the database clients may add a new data element and/or a cluster definition to the distributed storage system. Such an action involves the registration of the ownership on the new data element and the insertion of replicas of the new data element to the global database and to the local database at the site of the adding database client. Optionally, the new data element is added directly to the global database. In such an embodiment, the new data element is not added to the local databases.

Reference is now made, once again, to FIG. 3 and to a distributed storage system 1 which is used for supporting PLMN operators. Optionally, when one of the database clients 100 relays a request to access a data element that is located in another site, the data management module 7 replies with a READ ONLY replica of the requested data element. The READ ONLY replica is locally stored at the site of the requesting database client, in the global database and/or in the local database and allows access with low latency to the data that is stored therein. Optionally, the READ ONLY replica is deleted after a predefined period.

In some embodiments, not all the data elements which are related to a certain subscriber, are needed. In one embodiment of the present invention, the distributed storage system 1 supports partial data roaming wherein only part of the data elements, which are related to a certain subscriber, roam. Such an embodiment may be useful for managing data elements which are related to roaming subscribers. For example, a local database of a PLMN operator may control a number of data elements, which are related to a number of services of a certain subscriber such as the home location register (HLR) records, and media records such as video on demand (VOD) related records. When the certain subscriber PLMN roams outside of the coverage area of the PLMN operator to a temporarily location where she uses only mobile voice services, there is less need to transfer the VOD records. Optionally, a request from the temporary PLMN operator is replied to only with the HLR records.

Optionally, the distributed storage system 1 is adapted to manage the distribution of data elements that host information about subscribers of PLMN networks according to a fixed mobile convergence (FMC) architecture. In such an embodiment, each subscriber has a fixed identity, a mobile identity, and specific attributes that are relevant to each one of the identities. When a certain subscriber roams to a temporarily location and establishes a connection with a temporary PLMN operator, the related request is replied to only with specific attributes of the mobile identity.

Optionally, the distributed storage system 1 is adapted to manage the distribution of data elements that include HLR records and media records among different storage devices in order to provide a certain level of QoS to end users. In such an embodiment, the operator's topological deployment for the database clients may be adapted due to requirements of the database clients. For example, HLR database clients require higher availability and performance than VOD database clients and therefore may be more intensively deployed. Such an availability is required, for example, when a PLMN operator that has four major local sites in which the HLR and VOD database clients are installed and ten additional local sites where only HLR based database clients are installed. In such an embodiment, data elements that store HLR records are forwarded to the storage device that is part of the global database and located as near as possible to the location of the requesting database client. In such a manner, data elements that include HLR records are moved to one of the fourteen local sites that is the nearest local site to the subscriber; the VOD specific data is rendered locally available at one of the four data center sites that are nearest to the subscriber.

Optionally, the distributed storage system 1 is adapted to acquire information that is related to long distance mobile calls. When a long distance call is performed, a related HLR database client needs to access information of both calling side and callee side. In order to avoid data thrashing, the data elements, which are related to the callee side are stored for a limited time, with READ ONLY permission. For example, when the data elements are needed only for establishing a call, the data elements are cached at the local storage device at the site of the caller for a limited time. In such a manner, the data elements, which are related to the callee, are locally stored and can be used for supporting a redial or the like.

Optionally, the site that hosts the data elements which are related to the callee, remains the owner of the related data elements. In such a manner, the system may avoid redundant read and write commands.

Optionally, the distributed storage system 1 stores replicas of frequently requested data elements in each one of local databases 5. For example, if the distributed storage system 1 is used for managing the records of subscribers of a communication network, replicas of data elements of frequently called subscribers are stored at each one of the sites 3 or at sites 3 from which subscribers are expected to call. Such an embodiment may be used for preventing the thrashing that may occur as a result of an active SMS voting service to which a large number of subscribers from remote sites may call to cast a vote. Optionally, the distributed storage system 1 comprises a statistical analysis module for analyzing which of the data elements are frequently accessed and/or updated. Optionally, the statistical analysis module updates the replicas of frequently requested data elements in each one of local databases 5 according to the statistical analysis.

Optionally, the distributed storage system 1 stores a list of unauthorized roaming subscribers in each one of the sites 3.

Optionally, each storage device of the global database and/or local data storage sub-system 5 stores a list of roaming subscribers which are denied service. In such an embodiment, the distributed storage system 1 may locally verify whether the roaming subscriber may receive service or not. Optionally, the list is dynamically updated according to the data elements, which are acquired from the subscriber's home network. In one embodiment, the list is used to avoid redundant read and write commands that involves communication latency that is related to unauthorized roaming subscribers. The list is updated with roaming subscribers which tried to access the network that is connected to the distributed system and were denied of service. Optionally, the list is updated according to the subscribers of PLMN operators with which the operator that operates the distributed storage system 1 has roaming agreements.

Optionally, each list is updated locally. Optionally, the records of the list are added to the local cache of the locally accessed site. Such an embodiment reduces the overhead of recurrent trials to access the aforementioned network.

In one embodiment of the present invention, the distributed storage system 1 is connected to a roaming management system. As described above, the distributed storage system 1 is designed to reply to a database client that relays a request for a certain data with one or more related data elements. Optionally, a partial roaming process is supported by the distributed storage system 1 wherein the reply includes only a partial data set.

Upon request, the global storage sub-system 2 replies to requests for information about a roaming subscriber with data elements that represent a partial data set of the related roaming subscriber. Optionally, the partial data set includes data elements which are selected according to a schema, such as a table or a decision tree that maps the data elements on the global storage sub-system 2 and optionally stored as part of the global storage sub-system 2. The schema defines subscriber profiles that include the data to roam for each subscriber. The data to roam includes a subset of records that may be sent as a reply to the request. Such data may include the data that is related to an HLR subscriber profile of the related subscriber and/or one or more of the data elements which are associated with the international mobile subscriber identity (IMSI) of the related subscriber.

Optionally, each profile may associate one or more subscribers with one or more geographical sites. For example, each profile associates a subscriber with her HLR subscriber profile and her VOD profile in a certain geographical location and with her HLR subscriber profile in another geographical location. Optionally, these profiles are updated if additional subscribers are added, deleted or revised during the operation of the global database.

Optionally, the subscriber profile is dynamically updated according to the subscriber's behavior. For example, if the subscriber is associated with profile A that specifies a certain geographical location and the subscriber triggers a database client to relay a request from another geographical location which is optionally associated with profile B, then the expected partial data set is the union of both profiles.

Optionally, the partial data set is determined according to a request that defines operations and/or transaction.

Optionally, after the partial data set has been sent to the requesting database client, it is assumed that the partial data set is locally stored in the site through which the requesting database client submitted its request. Under this assumption, all the following requests are for the data that is locally stored at the site and that the partial data set encompasses all of the data that is required for similar types of requests. Therefore, no cross sub-system updates are required and the ACID level of the partial data set is maintained.

Optionally, the partial data set is determined according to statistical information. In such an embodiment, the distributed storage system 1 comprises a statistical analysis module that gathers statistics regarding which data and/or services each one of the subscribers requires at different geographical locations, for example according to specific data manipulation language (DML) statements. Based on the accumulated information, the statistical analysis module creates and/or revises profiles, such as the aforementioned profiles, optionally continuously.

Optionally, the partial data set may be selected according to a mixed policy. In such an embodiment, the partial data set may be assembled according to one or more of the aforementioned options for assembling a partial data set. In such an embodiment, if one or more of the aforementioned options are allowed simultaneously, a collision in the definition of the partial data set occurs. Optionally, a set of collision resolution rules is defined in order to avoid such collisions.

As described above, the partial data set satisfies the object management group transaction service specifications, which are incorporated herein by reference.

As described above, the distributed storage system 1 manages the storage of data elements according to the origin of the requests. Optionally, only when the distributed storage system 1 receives a request that includes a WRITE command it transfers the requested data element to a storage device of the requesting site. In such an embodiment, an access request that includes only a READ command does not result in the roaming of the data element. In such a manner, all the database clients use the most recent replica of the related data element.

Optionally, the site that stores the most recent replica of a given element propagates it to the other sites in an asynchronous manner. Optionally, if available, a READ command from non-owners is performed from a local replica of the requested data element. In such an embodiment, the used local replica may not be up-to-date; however, the latency of accessing it is relatively low.

Optionally, the local database at the site of the requesting database client is designed to store READ ONLY replicas of the requested data elements. In such an embodiment, the requested information is stored without requiring any change in the ownership status of the related replica. Multiple READ ONLY replicas may exist at different geographical sites and increase the memory utilization. Optionally, the data management module 7 comprises an updating sub-module that actively refreshes the READ ONLY replicas.

In one embodiment of the present invention, tags that mark replicas and related transactions as a READ ONLY replica are added.

Optionally, the data elements of the global database are updated in a bulk update. The bulk update may be performed at the system level, per subscriber, and/or per bulk update request.

As described above, updated replicas of a certain data element may be stored in the local data storage sub-systems 5. Optionally, when a data element that is stored in one of the local databases is edited, a bulk update is relayed to the data elements which are stored in the global database. Such an update ensures that when a bulk update is performed, all of the replicas in the global storage sub-system 2 that backup the edited data elements are updated.

Optionally, the distributed storage system 1 comprises one or more aging management modules that monitor and manage the storage of the local data storage sub-systems 5 at each one of the sites 3. As described above, data elements may roam from one site to another and replicas of the roaming data elements may be stored in each one of the storage devices at each one of the sites 3. In such an embodiment, there is a possibility that the storage space at the local data storage sub-systems 5 may be completely utilized, for example, when a READ ONLY replica is generated and stored in a separate site for each roaming subscriber.

Optionally, each data element replica is stamped with a time tag.

The aging management modules are designed to delete redundant replicas of the data elements of the global storage sub-system 2 according to one or more possible algorithms. Optionally, the aging management modules use a least recently used (LRU) algorithm to discard the least recently used replica of the data element. Optionally, the aging management modules use a least frequently used (LFU) algorithm that deletes the least used replica of the data element. Optionally, the aging management modules deletes READ ONLY replicas prior to other replicas.

Optionally, replicas of data elements are updated in an asynchronous manner. The advantage is that local update latencies are kept to a minimum. It should be noted that in such an embodiment, when a local data storage sub-system 5 experiences a DRP event, transactions may be lost. Alternatively, replicas of data elements are updated in a synchronously manner.

Optionally, the global storage sub-system 2 is designed with high availability features, such as a self-healing feature, a recovery from minority features, a persistent storage feature, and an automatic backup feature, and a restore feature. Optionally, the global storage sub-system 2 is defined according to a specified resiliency level. In such an embodiment, a plurality of replicas, optionally three, are distributed across the sites 3, optionally according to a DRP model. In case of a failure of one of the sites 3, the one or more remaining sites 3 provide continuous availability, optionally with no downtime. In addition, if the global database is provisioned sufficiently, no database performance degradation need be experienced as a result of a DRP event. It should be noted that the number of local data storage sub-systems 5 in the system is completely independent of the topology of the system.

As described above, the system comprises a number of local data storage sub-systems 5. Each local data storage sub-system 5 provides localized, low-latency access to its cached data elements. As described above, each local database caches one or more data elements of the global storage sub-system 2. Optionally, the local data storage sub-system 5 includes all the data elements of the global storage sub-system 2. Optionally, one or more of the local data storage sub-systems 5 provides service to a group of local subscribers. Optionally, the local data storage sub-system 5 is designed according to a multi-site topology. Optionally, the number of local data storage sub-systems 5 is not fixed and may be dynamically changed during the operation of the distributed storage system 1.

Optionally, the local data storage sub-system 5 implements a local resiliency solution that assures real-time responsiveness in a case of a server failure in one of the local sites. Optionally, the local data storage sub-system 5 is designed to perform a local recovery that allows a local database to recover independently from a failure event.

The global database is distributed across N sites, where N preferably denotes three or more sites. Optionally, the data management module 7 ensures that each data element is stored at three or more different geographical sites. In such an embodiment, if a site fails, a majority of valid replicas of a data element remains in at least two other sites. Optionally, when such a failure occurs, a self-healing protocol is initiated to heal the system. Once the failed site is recovered, the data management module 7 implements load balancing algorithms to regenerate the lost replicas of the data elements according to the majority of valid replicas.

As described above, local data storage sub-systems 5 are single site systems, wherein all the data elements are installed in a single geographical location. In case of a failure, all the data elements are lost. In such cases, the data stored in the failed local database may still be accessed via counterpart data elements in the global database. As such, data elements may be readily accessed by redirecting the database client to submit write/read requests directly to the global database or to any of the other local databases, ones. Optionally, the data elements are recovered as described above during the aforementioned redirection.

A local database may be disconnected from the global database, for example due to a network failure. In such cases, optionally after a pre-determined timeout period, the local database stops responding to local database clients' requests, triggering a timeout error at the requesting database clients. Before timing out, the local database may attempt to retransmit the submitted requests. Optionally, the number of retransmissions is configurable. Optionally, after the databases reconnects, the local database initiates a synchronization process with the global database and resumes operation.

It is expected that during the life of this patent many relevant devices and systems will be developed and the scope of the terms herein, particularly of the terms data, database, communication, data unit, global date store, and local data store are intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents, and patent database clients mentioned in this specification are herein incorporated in their entirety by reference into the specification, to the same extent as if each individual publication, patent or patent database client was specifically and individually indicated to be incorporated herein by reference. In addition, citation or identification of any reference in this database client shall not be construed as an admission that such reference is available as prior art to the present invention.

The invention claimed is:

1. A geographically distributed storage system for managing the distribution of a plurality of data elements as a global database coherently distributed over a plurality of sites, comprising:

a plurality of geographically distributed sites, each comprising a site storage unit configured for locally storing a portion of said globally coherent distributed database comprising the plurality of data elements, such that respectively stored portions form said global database and a local access point configured for receiving requests relating to any of the plurality of data elements wherever located on said distributed global database; and a data management module configured for forwarding requested data elements from respective portions of said global database at which said requested elements are stored to the local access point, said forwarding of said element being to a requesting one of said plurality of geographically distributed sites, from which said request from said access point is received, and storing said at least one requested data element at said requesting site, thereby to provide local accessibility to any given data element for future requests from said requesting site when a same element is requested a second time, while maintaining the global coherency of said globally coherent distributed database, wherein each said site storage unit comprises a global storage device of a dynamic storage sub-system, said dynamic storage sub-system being configured for storing at least a unified database comprising a replica of each said data element, and wherein each said data element comprises a tag indicative of one of said storage sub-systems, an access right to each said data element is exclusively granted to a respectively indicated sub-system.

2. The geographically distributed storage system of claim 1, wherein each said site storage unit comprises a local storage sub-system configured for locally storing respective said portion.

3. The geographically distributed storage system of claim 2, wherein said plurality of data elements comprises a cluster of frequently requested data elements, each said local storage sub-system being configured for caching said cluster.

4. The geographically distributed storage system of claim 2, wherein each said local storage sub-system is configured for receiving a plurality of requests such as said request; further comprising a statistic module configured for updating said locally stored data elements according to a statistical analysis of said plurality of requests.

5. The geographically distributed storage system of claim 1, wherein said data management module is configured for forwarding said at least one requested data element while maintaining a predefined atomicity, consistency, isolation, and durability (ACID) level of said globally coherent distributed database.

6. The geographically distributed storage system of claim 1, wherein said at least one requested data element is replied without communication latency to at least one subsequent request following said request.

7. The geographically distributed storage system of claim 1, wherein said unified database backing up one said plurality of elements of each said local storage sub-system.

8. The geographically distributed storage system of claim 1, wherein said access right comprises one member of the group consisting of: read, write, edit, lock, and replicate.

9. The geographically distributed storage system of claim 1, wherein said sites are respectively remotely located thereby to ensure a geography-based resilience.

10. The geographically distributed storage system of claim 1, wherein said local access point is configured for receiving a request for a cluster comprising data elements from said plurality of data elements, said data management module being configured for forwarding said cluster to the local access point at a first of said plurality of geographically distributed sites from which said request is received.

11. The geographically distributed storage system of claim 10, wherein at least some of said data elements are associated with respective entity identifiers, each member of said cluster having a common entity identifier.

12. The geographically distributed storage system of claim 10, wherein at least some of said data elements are associated with a plurality of criteria, said request being for ones of said plurality of data elements which fulfill at least one of said criteria.

13. The geographically distributed storage system of claim 1, wherein each said access point is configured for interfacing with a roaming management system, each said data element stores information needed for providing roaming services.

14. The geographically distributed storage system of claim 1, further comprising a blocking module having a list of blocked data elements, said blocking module being configured for preventing said local access point points from providing said at least one requested data element.

15. The geographically distributed storage system of claim 1, wherein each said local storage sub-system is configured for restoring said locally stored the data elements according to respective data elements of said unified database.

16. The geographically distributed storage system of claim 1, wherein said data management module is configured for identifying the type of said request, the access rights of said forwarded at least one requested data element being determined according to said type.

17. The geographically distributed storage system of claim 1, wherein requests for given data elements incur a local inertia.

18. The distributed storage system of claim 17, wherein said data management module is configured for forwarding said at least one requested data element while maintaining a predefined atomicity, consistency, isolation, and durability (ACID) level of said coherent distributed database.

19. The distributed storage system of claim 17, wherein said at least one requested data element is suppliable without communication latency to at least one subsequent repeat request from said access point following said request.

* * * * *